(12) United States Patent
Luo

(10) Patent No.: US 9,367,605 B2
(45) Date of Patent: Jun. 14, 2016

(54) ABSTRACT GENERATING SEARCH METHOD AND SYSTEM

(75) Inventor: Yi Luo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 239 days.

(21) Appl. No.: 12/937,562

(22) PCT Filed: Aug. 27, 2010

(86) PCT No.: PCT/US2010/047036
§ 371 (c)(1),
(2), (4) Date: Oct. 13, 2010

(87) PCT Pub. No.: WO2011/037721
PCT Pub. Date: Mar. 31, 2011

(65) Prior Publication Data
US 2011/0218989 A1    Sep. 8, 2011

(30) Foreign Application Priority Data
Sep. 23, 2009  (CN) .......................... 2009 1 0174208

(51) Int. Cl.
G06F 17/30    (2006.01)
G06F 7/00     (2006.01)

(52) U.S. Cl.
CPC .... *G06F 17/30622* (2013.01); *G06F 17/30719* (2013.01)

(58) Field of Classification Search
None
See application file for complete search history.

(56) References Cited

U.S. PATENT DOCUMENTS

| 5,721,897 A * | 2/1998 | Rubinstein ........ G06F 17/30616 |
| 5,913,215 A * | 6/1999 | Rubinstein et al. ........... 707/708 |
| 5,915,249 A   | 6/1999 | Spencer |

(Continued)

FOREIGN PATENT DOCUMENTS

| JP | H07129605 | 5/1995 |
| JP | 2004151791 | 5/2004 |

(Continued)

OTHER PUBLICATIONS

Chinese Office Action mailed Apr. 27, 2012 for Chinese patent application No. 200910174208.4, a counterpart foreign application of U.S. Appl. No. 12/937,562, 4 pages.

(Continued)

*Primary Examiner* — Sangwoo Ahn
(74) *Attorney, Agent, or Firm* — Lee & Hayes, PLLC (57) ABSTRACT

The present disclosure provides an information search method and system applicable in an information search system wherein each document has corresponding forward index data to address the issue of low search efficiency suffered by existing information search techniques. In one aspect, the method may include: receiving an inquiry word and obtaining one or more keywords contained in the inquiry word by segmentation; searching one or more documents matching the one or more keywords and forward index data corresponding to the one or more documents through the information search system's inverted index data; and determining an abstract of each of the one or more documents according to a corresponding document's forward index data, and outputting the abstract and information of the one or more documents as a search result. The proposed techniques can increase efficiency of information search and, at the meantime, guarantee accuracy of the search to a certain extent.

20 Claims, 4 Drawing Sheets (56) References Cited

U.S. PATENT DOCUMENTS

| | | | |
|---|---|---|---|
| 5,918,240 A * | 6/1999 | Kupiec | G06F 17/30719 707/E17.094 |
| 5,920,859 A | 7/1999 | Li | |
| 6,349,308 B1 | 2/2002 | Whang et al. | |
| 6,473,730 B1 * | 10/2002 | McKeown et al. | 704/9 |
| 6,567,810 B1 | 5/2003 | Singhal | |
| 7,257,767 B1 * | 8/2007 | Carden, Jr. | 707/999.01 |
| 7,590,645 B2 | 9/2009 | Nayak | |
| 7,630,963 B2 | 12/2009 | Larimore et al. | |
| 2001/0000356 A1 * | 4/2001 | Woods | G06F 17/30011 707/999.001 |
| 2005/0120004 A1 * | 6/2005 | Stata et al. | 707/3 |
| 2005/0198076 A1 | 9/2005 | Stata et al. | |
| 2006/0074871 A1 | 4/2006 | Meyerzon et al. | |
| 2007/0192293 A1 | 8/2007 | Swen | |
| 2008/0027933 A1 * | 1/2008 | Hussam | 707/6 |
| 2008/0077570 A1 * | 3/2008 | Tang et al. | 707/5 |
| 2008/0133473 A1 | 6/2008 | Broder et al. | |
| 2008/0270394 A1 * | 10/2008 | Carson et al. | 707/5 |
| 2009/0024612 A1 * | 1/2009 | Tang et al. | 707/5 |
| 2009/0222441 A1 | 9/2009 | Broder et al. | |
| 2009/0300006 A1 * | 12/2009 | Bose Rantham | G06F 17/30619 |
| 2010/0205172 A1 * | 8/2010 | Luk | 707/715 |
| 2010/0228734 A1 | 9/2010 | Murthy | |
| 2011/0219000 A1 * | 9/2011 | Kusumura | 707/737 |

FOREIGN PATENT DOCUMENTS

| | | |
|---|---|---|
| JP | 2005208852 | 8/2005 |
| JP | 2005234635 | 9/2005 |
| JP | 2009157865 | 7/2009 |

OTHER PUBLICATIONS

Extended European Search Report mailed Apr. 24, 2013 for European patent application No. 10819213.9, 5 pages.

Japanese Office Action mailed Jan. 21, 2014 for Japanese patent application No. 2012-530900, a counterpart foreign application of U.S. Appl. No. 12/937,562, 6 pages.

Manabe, et al., "Natural Language Information Retrieval for XML Database System", Toshiba Review, Feb. 1, 2009, vol. 64, No. 2, pp. 14-17 (includes English Abstract).

* cited by examiner

ABSTRACT GENERATING SEARCH METHOD AND SYSTEM

CROSS REFERENCE TO RELATED PATENT APPLICATIONS

This application is a national stage of an international patent application PCT/US10/47036, filed Aug. 27, 2010, entitled "Information Search Method and System", which claims priority from Chinese Patent Application No. 200910174208.4 filed on Sep. 23, 2009, entitled "INFORMATION SEARCH METHOD AND SYSTEM," which applications are hereby incorporated in their entirety by reference.

TECHNICAL FIELD

The present disclosure relates to a full-text data search technology in the communication field, and particularly relates to an information search method and an information search system.

BACKGROUND

With the rapid development of Internet search engine technologies and internet search enterprises, information search systems (or search engines) have become a necessary tool for more and more users of the Internet.

When a person uses a search engine, a common scenario is for the person to input inquiry word, or search term, and obtain a search result through a backend operation of the search engine. The three elements constituting the typical search result include: title, abstract, and URL (or generally referred to as TAU, which is an acronym from the first letter of the three words: title, abstract, and URL). Of the three elements, the abstract generally contains the largest volume of information from a perspective of information volume, and the largest display area from a perspective of webpage display effect, and largely determines whether the search result is correct from a perspective of end user experience such that the user can determine whether the search result is what the user seeks according to information contained in the abstract. Therefore, an abstract generation system that is high-performance, flexible, custom-made, and has excellent human-machine user interface is an indispensable important component of a search engine (or information search system).

A traditional abstract generation method is based on the user's inquiry word to search full-text data at real time, and, based on the result of full-text search, to extract the paragraph best matching the inquiry word as the abstract. This is usually done through calculation of word frequency, word distance, and other parameters by text matching and weighted algorithms. Finally, the traditional abstract generation method presents the search result, including the title, abstract, and URL, to the user as final display.

For information search, a traditional search engine needs to conduct match search in the full-text data. The abstract generation is also based on the full-text data. As the volume of information of the full-text data is huge, long search time and low search efficiency tend to occur as a result.

SUMMARY OF THE DISCLOSURE

The present disclosure provides an information search method and system to solve the problem of low search efficiency suffered by existing information search technologies.

In one aspect, an information search method provided by the present disclosure is applicable in an information search system where each document has corresponding forward index data. Each document's forward index data uses each word in a respective document as an index and records each word's location in the respective document. The method may include a number of steps as described below.

receiving an inquiry word and obtaining a keyword contained in the inquiry word by segmentation;

searching a document matching the keyword and forward index data corresponding the document through an information search system's inverted index data; and     determining an abstract of the document according to the document's forward index data, and outputting the abstract and information of the document as a search result.

In another aspect, an information search system provided by the present disclosure includes a storage module that stores the system's inverted index data and each document's corresponding forward index data. Each document's forward index data uses each word in a respective document as an index and records each word's location in the respective document. The system may also include a number of other components as described below.

an input module configured to receive an inquiry word input into the system;

a search module configured to obtain a keyword contained in the inquiry word by segmentation; to search a document matching the keyword and forward index data corresponding the document through the inverted index data; to determine an abstract of the document according to the document's forward index data; and     an output module configured to output the abstract and information of the document as a search result.

The above embodiments of the present disclosure use the inverted index data to conduct the search and, after obtaining a document matching the inquiry word, uses the document's forward index data to generate an abstract of the document. Therefore, the technique fully utilizes characteristics of the document's forward index data that has less data volume than full-text data but the content description still retains certain accuracy. Compared with the traditional information system using full-text search to obtain the search result, the embodiments of the present disclosure can increase an efficiency of match search by using inquiry word, increase an efficiency of abstract generation, and guarantee to a certain extent an exactness of the search result and the generated abstract.

DETAILED DESCRIPTION

The embodiments of the present disclosure are described in detail below with reference to the figures.

An information search method of the present disclosure is applicable in an information search system. The information search system not only stores inverted index data of a document (or full-text data) set, but also provides independent forward index data corresponding to each document. The existing general-purpose information search system generally includes the document set's inverted index data and also includes independent forward index data corresponding to each document (such as PostgreSQL, an open source full-text search system). With respect to an information search system that temporarily does not have independent forward index data corresponding to each document, various techniques can be used to obtain independent forward index data corresponding to each document from the whole document set's inverted index data. Such process can be completed at off-line status and will not impact online searching performance of the information search system.

The document set's inverted index data is a document index established based on words. For example, each word is a record in the database, wherein each word is a keyword followed by document identification, location, etc. Suppose that there are three documents: file 1, file 2, and file 3. The documents contents are described below:

file 1 (word 1, word 2, word 3, word 4,)

file 2 (word a, word b, word c, word d, word a, word c, word d,)

file 3 (word 1, word a, word 3, word d,)

The inverted index data of the document set, composed of the above three documents, is as follows: word 1 (file 1, file 3), word 2 (file 1), word 3 (file 1, file 3), word a (file 2, file 3), and so on.

A document's forward index data is an index of a word's location in the document according to words contained in the document. For example, for the above file 2, if locations of different words contained in file 2 are recorded as pos 1, pos 2, etc, then the forward index data is described as follows: file 2 (word a: pos 1, pos 5; word b: pos 2; word c: pos 3, pos 6; word d: pos 4, pos 7,).

Thus, each document's forward index data can be obtained according to the document and the inverted index data.

For the convenience of data maintenance and management, the document set and its inverted index data, as well as each document's independent forward index data, can be organized in the form of a database. Other forms can also be used such as in the form of a file. In the interest of brevity, the embodiments of the present disclosure are described by using the document set and each document's independent forward index data organized in the form of a database. It is understood that the scope of the present disclosure is not therefore limited to organizing in the form of a database.

Figure 1:
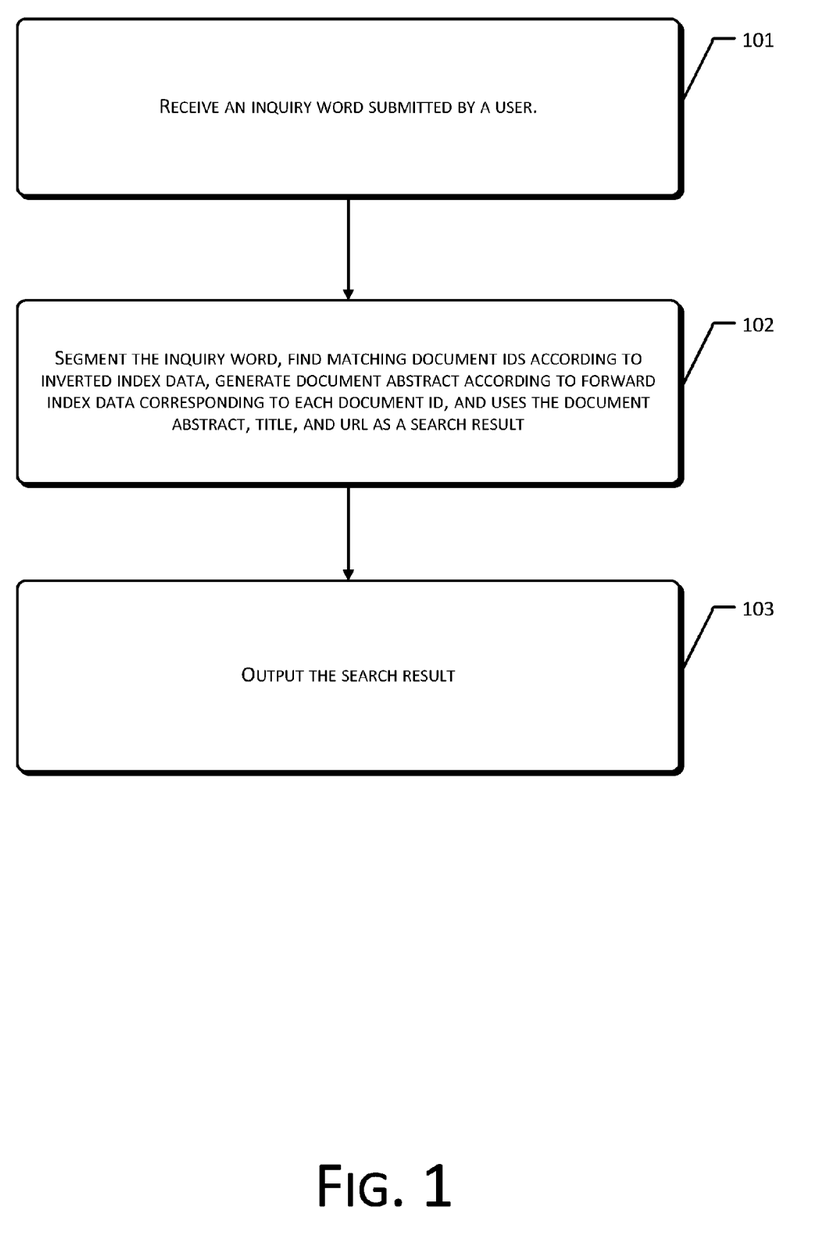
FIG. 1 illustrates an exemplary flowchart of information search in accordance with the present disclosure.

FIG. 1 shows an exemplary flowchart of an information search system providing information search service to a user in accordance with an embodiment of the present disclosure. The information search system includes a full-text database storing full-text data of documents, an inverted index database storing inverted index data, and a forward index database storing each document's corresponding forward index data. The full-text database, the forward index database, and the full-text database and the inverted index database are associated with each other by a defined index (such as document identification) so that each document's forward index corresponds to a respective document one by one.

The process of information search based on the above information search system will now be described.

At 101, the information system receives an inquiry word submitted by a user.

The information search system can provide an information search interface to the user. Such interface can provide operation instructions to the user to input the inquiry word and submit the inquiry word to the information search system. The inquiry word input by the user can be a word, a phase comprising multiple words, or multiple words (or phases) connected by relational operators (such as the words "and", "or").

At 102, the information search system segments the inquiry word submitted by the user to obtain one or more keywords contained in the inquiry word, and then finds one or more documents matching the one or more keywords according to inverted index data in the inverted index database, finds forward index data corresponding to each of the one or more documents from the forward index database according to the found documents, generates an abstract of each document according to the forward index data of each document, and uses the generated abstract and the corresponding document's title, URL, and other information as a search result.

In this step, after determining documents matching the one or more keywords, the information system can obtain forward index data corresponding to such document(s). As there can be multiple documents found by the information search system, to increase the usefulness of the found information search result and the user experience, the information system can rank the found documents from high to low according to the degree of matching between a respective document and the one or more keywords to obtain a corresponding sequence of document identifications.

At 103, the information search system outputs the search result according to the generated search result and the sequence of document identifications. The search result can be presented at a search result interface. The search result includes the one or more documents' titles, URLs, and abstracts. The abstract generally includes the keywords. Preferably, the abstract is a portion of the document that has a high degree of matching with the one or more keywords.

Figure 2:
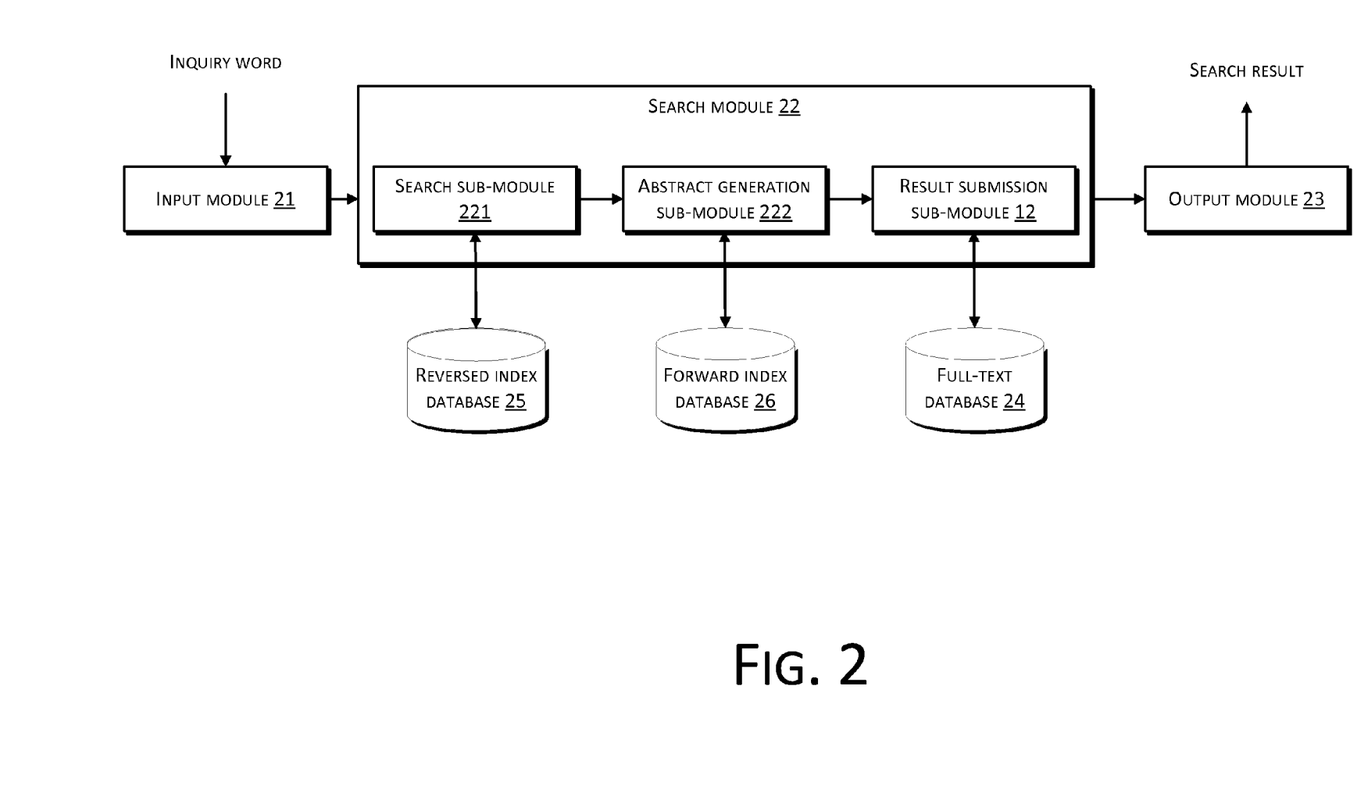
FIG. 2 illustrates an exemplary diagram of an information search system in accordance with the present disclosure.

In this step, the information search system can obtain the corresponding document's title, URL, and abstract from the full-text database according to the sequence of document identification from the preceding step. (Generally, the full-text database can use a document's identification, a title, or a URL as the index data of full text of a document.) Certainly, if the forward index database also includes the document's title and URL, such information can be directly obtained from the forward index database and then output or displayed according to an order of the sequence of document identifications. The information search system can also regulate a format of the output search result and a limit on the length of the document In one embodiment, the aforementioned information search system, as shown in FIG. 2, includes the following function modules: an input module 21, a search module 22, and an output module 23. It can also include a full-text database 24, an inverted index database 25, and a forward index database 26. Full-text database 24 stores full-text data of various documents and can use the document identification, title, or URL as an index to store the document's full-text data. Inverted index database 25 stores inverted index data corresponding to each document. Forward index database 26 stores forward index data corresponding to each document. The function realized by each module can correspond to steps in the above-described flow process with reference to FIG. 1. Search module 22 may further include a search sub-module 221, an abstract generation sub-module 222, and a result submission sub-module 223.

FIG. 2 illustrates an exemplary process of information search as detailed below.

Input module 21 receives an inquiry word submitted by a user, and then submits the inquiry word to search module 22. Search module 22 segments the inquiry word to obtain one or more keywords, finds one or more documents matching the one or more keywords in inverted index database 25 according to the one or more keywords, generates an abstract of each of the one or more documents according to forward index data of a corresponding document in forward index database 26, and then outputs to output module 23 a search result including each of the one or more documents' abstract. If a respective document's title and URL need to be output, the document's title and URL can be further obtained from full-text database 24 or inverted index database 25. After receiving the search result, output module 23 outputs the search result.

For each document corresponding to the one or more keywords, search module 22 can scan each word in its corresponding forward index data at forward index database 26 to establish a forward sequence of all words and a forward index sequence including only the one or more keywords. Search module 22, according to these two sequences, determines a starting point and an ending point of the abstract in the forward sequence or the full-text data, to obtain the document abstract. The detailed implementation of information search function of search module 22 requires some variables including: a document identification sequence that stores identifications of a found document, and an Array_A array that stores a forward sequence of all words contained in the found documents.

The forward sequence records each word and its appearance location in the full-text of the document in an order, and can be represented by a link of word text and location such as:

Array_A includes records (pos 1: word 1, pos 2: word 2, pos 3: word 3, pos 4: word 4), wherein: "pos" represents a location of a respective word's first character in the full-text data, and "word" represents a text of a word. In other words, Array_A uses location of the respective word as an index to record text of each word.

a Map_A array that stores the forward index sequence of each keyword obtained after segmentation of inquiry word. Such forward index sequence records a location of each keyword in the corresponding document, and can use a red-black tree structure. (Red-black tree is a special type of binary tree, a data structure used in computer science to organize data such as data block. All data blocks are stored at nodes.) The red-black tree can be used to organize and store keyword text and location link. For example, if word 1 and word 2 in the above Array_A are keywords, then:

Map_A records (word 1: pos 1, pos 4; word 2: pos 2 . . . ), wherein: pos represents a location of a respective word's first character in the full-text data, keyword represents a text of a respective keyword. In other words, Map_A uses text of word (the word is a word matching the keyword) as an index to record location of the respective word.

A Res_Beg and a Res_End that store a starting and an ending position, respectively, of the abstract.

A Best_Path that stores a best abstract path including parameters of a starting position and an ending position of the abstract. The parameters can be used to define corresponding portion of text in the forward index data or full-text data. The degree of matching between the portion of text and the keyword defined by the best abstract path is higher than the other portions.

An RL represents an assigned value of an abstract length, which is usually represented by numbers. The value can be assigned at initiation of the system.

The information search process of search module 22 can be divided into two phases: (1) a document search phase to search the one or more documents matching the one or more keywords (such as the document including the keyword, or the document including a word equivalent to the keyword); and (2) an abstract generation phase to generate the corresponding abstract for each of the found documents.

At the document search phase, search sub-module 221 segments the inquiry word submitted by the user and obtains one or more keywords contained in the inquiry word, finds matches in inverted index database 25 to find identifications of documents that match the keywords, ranks the identifications from high to low according to the degree of matching, and stores the ranked identifications as the sequence of document identifications. The segmentation in this phase can be realized by multiple techniques, such as the existing Chinese segmentation technique. The operation to find matches in inverted index database 24 can use the existing full-text search technology. It is understandable that the segmentation and full-text search techniques used in this embodiment do not limit the scope of the present disclosure.

At the abstract generation phase, abstract generation sub-module 222 traverses forward index data corresponding to the document identification of each document in forward index database 26 according to document identifications in the sequence of document identifications. It records the location and text of each traversed word and puts them in the array Array_A (generally makes records into the array data structure). If the respective word matches one of the keywords, it records the location and text of the respective word in the set Map_A. After completion of traversing forward index data of the document, if the total length of the text of all words in Array_A is less than RL, then the best abstract path is from a location of the first word to a location of the last word in Array_A. Otherwise, abstract generation sub-module 222 traverses the text of word and location link table in Map_A to find Res_Beg and Res_End corresponding to a starting word and an ending word of a satisfying shortest text paragraph. In such case the path from Res_Beg to Res_End in Array_A is the best abstract path. After determining the best abstract path, abstract generation sub-module 222 determines a relevant portion from forward index data or full-text data as the abstract according to the determined best abstract path, and submits it to result submission sub-module 223.

Conditions for the best abstract path may include: (1) a length of text paragraph from Res_Beg to Res_End is or less than RL; and (2) there is a highest number of keywords between Res_Beg and Res_End.

If there are multiple abstract paths satisfying the above two conditions, from the abstracts defined by the abstract paths, in one embodiment the abstract path with the highest number of repetitive keywords is the best abstract path.

Result submission sub-module 223 finds the corresponding document tile, URL and other information from full-text database 24 or inverted index database 25 according to each document identification recorded in the sequence of document identifications, and submits them together with the abstract to output module 23.

Output module 23 may include an abstract format argument parameter Fmt_Arg (English abstract of Format Argument). Output module 23 formats the abstract text, the document tile, URL, and other information according to the parameter Fmt_Arg, and displays relevant information of the corresponding document (such as tile, URL, and abstract) in a form of the preset format according to the ranking sequence of document identifications in the sequence of document identifications. Preferably, the results are displayed by web marking language, such as HTML (HyperText Markup Language) that is universally used in World Wide Web, to provide a striking and easy-to-identify search result to the user so that the user can have better user experience.

Figure 3A:
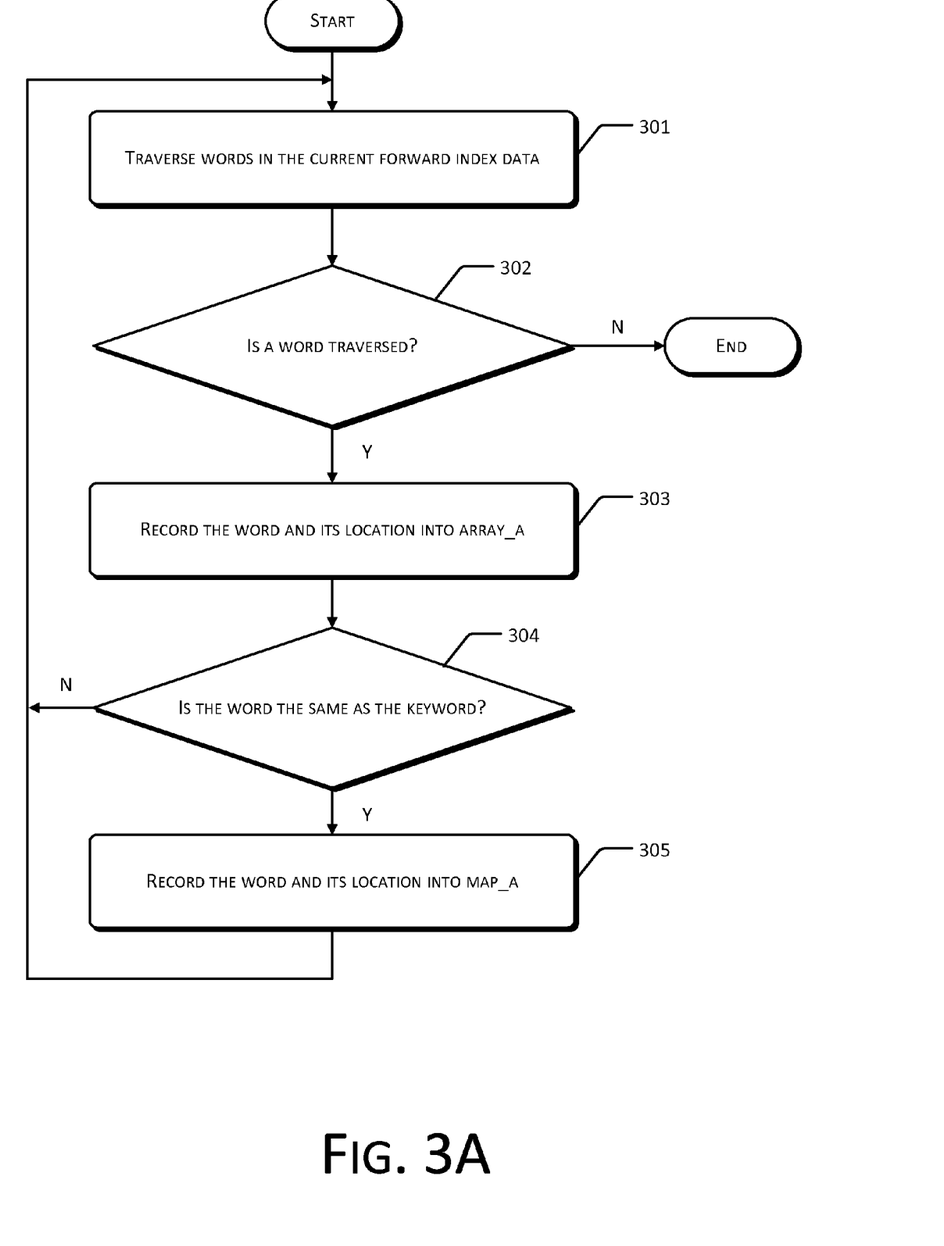
FIG. 3A and FIG. 3B show exemplary processing flowcharts of a search module of an information search system in accordance with the present disclosure.
Figure 3B:
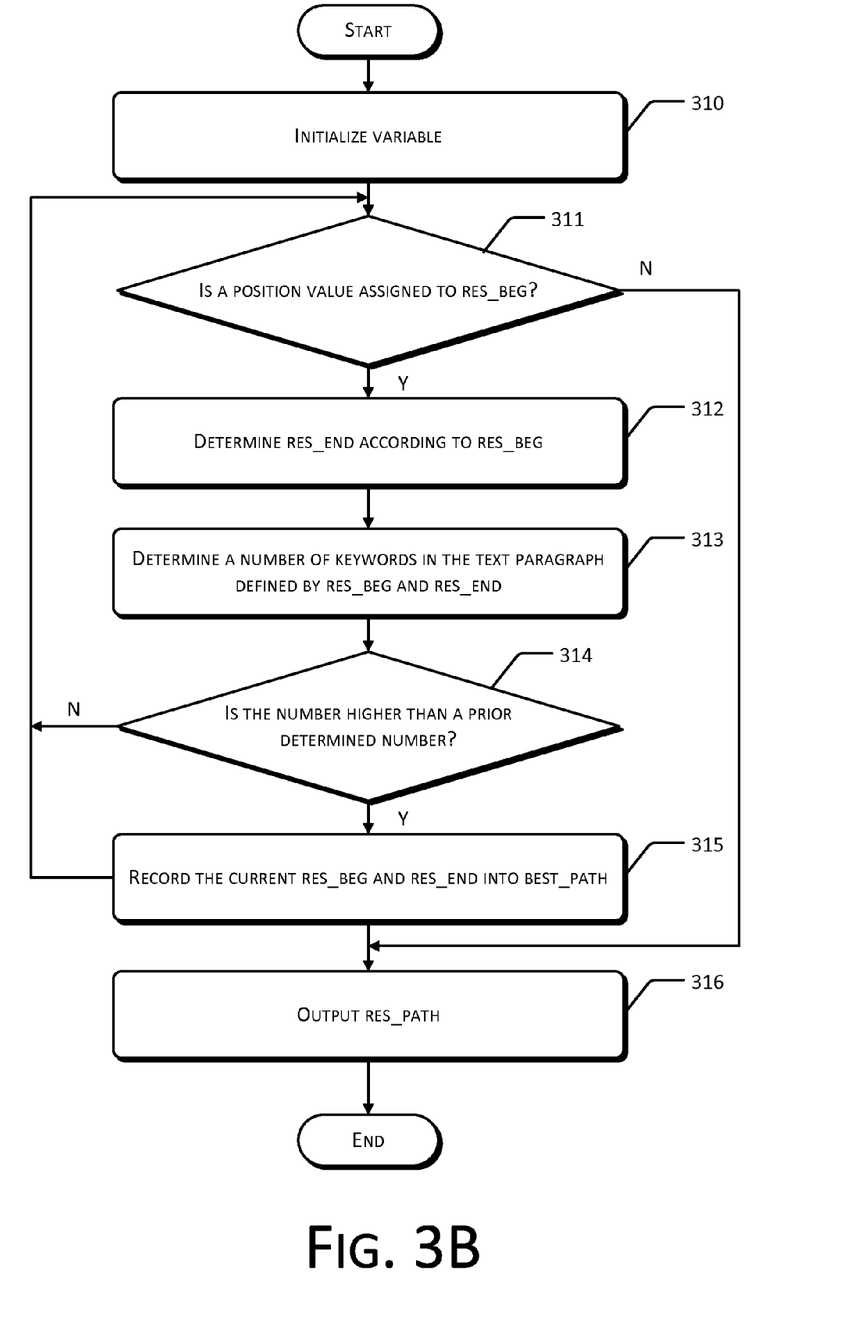

The exemplary flow process that abstraction generation module 222 traverses forward index data of the document is shown in FIG. 3A. The exemplary flow process to generate the best abstract path after completion of traverse is shown in FIG. 3B.

Abstract generation sub-module 222 traverse forward index data of document identification of each document in the sequence of document identifications respectively. As shown in FIG. 3A, after abstract generation module 222 obtains document identification from the sequence of document identifications, it finds corresponding forward index data from forward index database 26 and implements a number of steps as described below.

At 301, words in the forward index data are traversed word by word.

At 302, the process determines whether a word is traversed and, if affirmative, proceeds to 303; otherwise the process proceeds to 306.

In the step, there are two situations that a word cannot be traversed. One is that the traverse has gone through to an end of the forward index data. In other words, the traverse of the current forward index data has been finished. The other situation is that the current forward index data is empty.

At 303, the word's text and the word's location in the forward index data are recorded into the Array_A. Each word's starting and ending positions can be determined from the records in the Array_A. As an example of Chinese word "计算机" (the literal translation of which is "computing counting machine" in English), a starting position is a location of the Chinese character "计" ("computing" in English), and an ending position is a location of the Chinese character "机" ("machine" in English). For English or other languages that include word space, a word's starting and ending positions can be determined by the word space.

At 304, the process determines whether the word is the same as a keyword and, if affirmative, proceeds to 305; otherwise, proceeds to 301 and continues to traverse other words after the word in concern.

At 305, the word's text and the word's location are recorded in the forward index data in the Map_A.

After abstraction generation sub-module 222 traverses the forward index data, it can determine the best abstract path according to the Array_A and the Map_A obtained by traverse, and assign parameter value of the best abstract path to the Best_Path. The exemplary process is shown in the FIG. 3B, including a number of steps described below.

At 310, the process assigns 0 to variable N, and assigns null to the Best_Path.

At 311, the process assigns a word's location value from the Map_A to the Res-Beg, and determines a word's location value from the Array_A according to RL such that a text paragraph with a length of RL defined from the Res_Beg to the determined position value includes the keyword. If such position value can be obtained, the proceed to 312; otherwise, the process proceed to 316.

At 312, the process assigns the determined position value to the Res_End such that the length of text between the Res_Beg and the Res_End does not exceed RL. Preferably, according to record in the Array_A, Res_Beg corresponds to a starting position of the word in the Array_A (or the location of the first character of the word), and Res_End corresponds to an ending position of the word in the Array_A (or the location of the last character of the word) so that the text paragraph's content between the Res_Beg and the Res_End is clear and complete.

At 313, the process determines a number of keywords in the text paragraph between the Res_Beg and the Res_End according to the Map_A, and assigns the number to a variable n.

At 314, the process determines whether n is larger than N and, if affirmative, proceeds to 315; otherwise, the process returns to 311 to determine the next different Res_Beg.

At 315, the process assigns the value of n to N, zero clears n, records the current Res_Beg and Res_End into the Best_Path, and returns to 311 to determine the next different Res_End.

At 316, the process determines that the current value of Best_Path is the best abstract path and outputs the Best_Path.

As shown by the process in FIG. 3B, abstract generation sub-module 222, through multiple recycle operations, by assigning a different position value to the Res_Beg each time, in an event that there is a highest number of keywords in the text paragraph defined by the Res_Beg and Res_End, records the Best_Path as being from the Res_Beg to the Res_End. Thus there is the highest number of keywords in the text paragraph defined by the Res_Beg and Res_End recorded in the Best_Path, and the best abstract path is obtained.

It should be noted that during the process of determining the best abstract path, the best abstract path of the forward index data can be immediately determined by the traverse result after traverse of each forward index data. Alternatively, the best abstract path can be determined by traversing result of each forward index data after traverse of all of the forward index data.

The following descriptions use an example of information search system applicable in the Internet to illustrate the implementation process.

When there is a new webpage published in the Internet, the forward index data of the webpage content is stored into the forward index database of the information search system, and a corresponding relationship with the webpage is established. In this embodiment, the new published webpage and its corresponding forward index data is as follows:

Webpage document 1: identification=100, titled "secured technology applicable to computer".

The corresponding forward index data is (computer: 2, 50, 90; security: 25, . . . ) with a length of 100 characters. It represents that the word "computer" appears at locations of the $2^{nd}$, the $50^{th}$, and the $90^{th}$ characters of a full-text document of the webpage document 1, and the word "security" appears at the location of the $25^{th}$ character.

Webpage document 2: identification=200, titled "how to increase security of the computer".

The corresponding forward index data is (computer: 10, 70; security: 15, . . . ) with a length of 100 characters. It represents that the word "computer" appears at locations of the 10th and the $70^{th}$ characters of a full-text document of the webpage document 2, and the word "security" appears at the location of the $15^{th}$ character.

The inverted index data includes computer (identification 100, 200), security (identification 100, identification 200), . . . .

The data format of the search result of the information search system is HTML, and the length of the abstract text is no longer than 50 characters.

When the system receives the inquiry words "computer security" submitted by the user, it obtains keywords "computer" and "security" after segmentation. It conducts a match inquiry in the inverted index data and finds that the web pages including the two keywords include the webpage with identification=100 and the webpage with identification=200. It then determines the corresponding forward index data according to the web pages. Because the keywords appear four times in the web page with identification=100 and three times in the webpage with identification=200, it regards that the former has a higher degree of matching and then traverses the two forward index data respectively.

After traversing the forward index data of the web page with document identification=100, it can obtain the following:

Array_A: ( . . . 2: computer; . . . 25: security; . . . 50: computer; . . . 90: computer; . . . ); and Map_A: (computer: 2, 50, 90; security: 25).

According to the obtained Array_A and Map_A, it can further be obtained that there are three keywords in the text paragraph from the starting position 2 to the ending position 52, the number of which is more than the number of keywords in any other text paragraph with a length of 50. Thus the starting and ending positions [2, 52] provide the best abstract path.

For the same reason, through the traverse result of the forward index data of the webpage with identification=200, the best abstract path is determined to be [1, 50].

Then, the system generates the abstract according to the determined best abstract path, and displays in HTML format the titles, URL, and abstracts of the web page with identification=100 and the web page with identification=200 to the user as the research result according to the degree of matching between the document and the inquiry words.

The present disclosure also provides an alternative for the above-described technique. During the generation of the abstract, the abstract path is not obtained by traverse of the forward index data but obtained by traverse of the full-text data, and the abstract text is correspondingly obtained from the full-text according to the obtained abstract path. The detailed traverse process and determination method of abstract path are similar to those describe above, and a detailed description will not be provided in the interest of brevity.

In comparison with the traditional information search techniques, the techniques provided by the present disclosure only need to segment the inquiry word. In contrast, conventional information search technologies need to segment both the inquiry word and the full-text data. Thus the search efficiency of the techniques provided by the present disclosure is higher than that of the conventional techniques. The techniques provided by the present disclosure also use the forward index data of a document to generate the abstract of the document. In contrast, the conventional techniques use the full-text data of a document to generate the abstract of the document. On one hand, the forward index data of the document has less data volume than the full-text data of the same document, and thereby increases efficiency. On the other hand, it is relatively easier to use the forward index data of the document to calculate the frequency and times of words, thereby conveniently and correctly determining the abstract of the document and correctly and comprehensively summarizing the contents corresponding to the full-text data. Thus, it can guarantee the reasonableness and accuracy of the search result to a certain extent by using the forward index data of the document to generate the abstract.

In general, the embodiments of the present disclosure fully utilize the existing full-text index structure of the information search system and fully consider the existing display format of the search result, thereby utilizing more accurate and pertinent data to increase generation efficiency and user satisfaction with the final result, when generating the abstract. The information search system provided by the present disclosure has high cohesive and low coupling characteristics, and is easy to be integrated with the various existing search systems. In addition, the information system provided by the present disclosure also has high-performance, flexible, and easy-for-customization characteristics.

The present disclosure is described by reference to the flowcharts and/or diagrams of the method, apparatus (system), and computer software of the present disclosure. It can be understood that computer software instructions can implement each flowchart and/or diagram, or a combination of the flowchart and diagram of the flowchart figures and/or diagram figures. Such computer software instructions can be embedded into a general-purpose computer, a special-purpose computer, an embedded device or any other programmable data processing device to implement a machine that can use the instructions executed by the computer or other programmable data processing device to realize functions designated by one or more flow processes of the flowchart figures and/or one or more diagrams of the diagram figures.

Such computer program instructions may also be stored into a tangible, non-transitory computer-readable storage medium that can function in a specific way and boot the computer or any other programmable data processing device such that the instructions stored in the computer-readable storage medium can implement functions as an instruction apparatus. The instruction apparatus can realize functions designated by one or more flow processes of the flowchart figures and/or one or more diagrams of the diagram figures.

Such computer program instructions may also be loaded into the computer or any other programmable data processing device such that the computer or the programmable data processing device can perform a plurality of operation steps to realize functions by operation of computer. Thus instructions performed at the computer or any other programmable data processing device implements functions designated by one or more flow processes of the flowchart figures and/or one or more diagrams of the diagram figures.

A person of ordinary skill in the art can make various changes and modifications of the present disclosure without deviating from the spirit and scope of the present disclosure. Therefore, provided that such changes and modifications of the present disclosure are within the coverage of the claims of the present disclosure or its equivalents, the present disclosure also covers such changes and modifications.

What is claimed is:

1. A method comprising:
   receiving, by a computing device, an inquiry word;
   segmenting, by the computing device, the inquiry word into one or more keywords;
   searching, by the computing device, an inverted index of a group of documents to determine in the group one or more documents in which one or more of the keywords are matched; and
   searching, by the computing device, a forward index of a respective document of the determined one or more documents to generate an abstract for the respective document, the searching including:
      determining a length limit of the abstract;
      identifying a plurality of portions within the respective document, each portion of the plurality of portions including a respective beginning position in the respective document and a respective ending position in the respective document, the identifying including identifying, within the respective document, every portion that is within the length limit by traversing the forward index character-by-character or word-by-word;

finding a portion among the plurality of portions, the portion including a highest number of the one or more keywords between a beginning position and an ending position compared with any other portion of the plurality of portions; and selecting the found portion to be the abstract of the respective document.

2. The method of claim 1, wherein each portion has a length that does not exceed the length limit.

3. The method of claim 2, wherein, when multiple portions in the plurality of portions each include the highest number of the one or more keywords, the abstract is one of the multiple portions that has a greatest total number of the keywords, including keywords that are repeated.

4. The method of claim 1, wherein the identifying the plurality of portions within the respective document comprises:

traversing, by the computing device, at least one word in the forward index of the respective document;

recording, by the computing device, the at least one traversed word and a location of the at least one traversed word in a first data structure by using the location of the traversed word as an index of the first data structure; and when the at least one traversed word matches one of the keywords, recording, by the computing device, the at least one traversed word and the location of the at least one traversed word in a second data structure by using the at least one traversed word as an index of the second data structure.

5. A system comprising:

one or more data processing devices; and one or more tangible computer-readable storage media having stored thereon computer executable components comprising:

a storage module configured to store an inverted index of documents in the system and forward indices corresponding to each of the documents;

an input module configured to receive an inquiry word; and a search module configured to segment the inquiry word into one or more keywords, search the inverted index to determine one or more documents in which one or more of the keywords are matched, search a forward index of a respective document of the determined one or more documents to generate an abstract for the respective document, the search including:

determining a length limit of the abstract;

identifying a plurality of portions within the respective document, each portion of the plurality of portions including a respective beginning position in the respective document and a respective ending position in the respective document, the identifying including identifying, within the respective document, every portion that is within the length limit by traversing the forward index character-by-character or word-by-word;

finding a portion among the plurality of portions, the portion including a highest number of the one or more keywords between a beginning position and an ending position compared with any other portion of the plurality of portions; and selecting the found portion to be the abstract of the respective document.

6. The system of claim 5, wherein each portion has a length that does not exceed the length limit.

7. The system of claim 6, wherein, when multiple portions in the plurality of portions each include the highest number of the one or more keywords, the abstract is one of the multiple portions that has a greatest total number of the keywords, including keywords that are repeated.

8. The system of claim 5, wherein the search module further comprises:

a search sub-module configured to segment the inquiry word into the one or more keywords, and determine the one or more documents matching the one or more keywords based on the inverted index;

an abstract generation sub-module configured to traverse at least one word in the forward index of the respective documents, record the at least one traversed word and a location of the at least one traversed word in a first data structure by using the location of the traversed word as an index of the first data structure;

when the at least one traversed word matches one of the keywords, record the traversed word and the location of the at least one traversed word in a second data structure by using the at least one traversed word as an index of the second data structure;

determine the beginning position of the abstract and the ending position of the abstract according to the first data structure, the second data structure, and the length limit, wherein:

in response to determining that a total length of traversed words in the first data structure is less than the length limit, set the beginning position to a location of a first traversed word in the first data structure and set the ending position to a location of a last traversed word in the first data structure; or in response to determining that the total length of traversed words in the first data structure is not less than the length limit, utilize the second data structure to determine one or more portions of the respective document that have lengths less than the length limit, to determine the portion of the one or more portions that has the highest number of the one or more keywords, and to set the beginning position and ending position of the portion based on the locations of a first traversed word and a last traversed word, respectively, in the portion; and generate the abstract according to the determined beginning position and the ending position; and a submission sub-module configured to submit to an output module the generated abstracts.

9. One or more tangible computer-readable storage media having computer-executable instructions stored thereon that are configured to program one or more computing devices to perform operations comprising:

receiving an inquiry word;

segmenting the inquiry word into one or more keywords;

searching an inverted index of a group of documents to determine in the group one or more documents in which one or more of the keywords are matched; and searching a forward index of a respective document of the determined one or more documents to generate an abstract for the respective document, the searching including:

determining a length limit of the abstract;

identifying a plurality of portions within the respective document, each portion of the plurality of portions including a respective beginning position in the respective document and a respective ending position in the respective document, the identifying including identifying, within the respective document, every portion that is within the length limit by traversing the forward index character-by-character or word-by-word;

finding a portion among the plurality of portions, the portion including a highest number of the one or more keywords between a beginning position and an ending position compared with any other portion of the plurality of portions; and selecting the found portion to be the abstract of the respective document.

10. The one or more tangible computer-readable storage media of claim 9, wherein the identifying the plurality of portions within the respective document comprises:

traversing, by the computing device, at least one word in the forward index of the respective document;

recording, by the computing device, the at least one traversed word and a location of the at least one traversed word in a first data structure by using the location of the traversed word as an index of the first data structure; and when the at least one traversed word matches one of the keywords, recording, by the computing device, the at least one traversed word and the location of the at least one traversed word in a second data structure by using the at least one traversed word as an index of the second data structure.

11. The method of claim 1, further comprising outputting, by the computing device, the abstract as a search result.

12. The method of claim 11, further comprising:

ranking, by the computing device, abstracts of multiple determined documents based on a number of the keywords from the inquiry word that are matched in each of the documents; and outputting, by the computing device, the ranked abstracts according to a predetermined data format.

13. The system of claim 5, further comprising an output module configured to output the abstract as a search result.

14. The system of claim 13, wherein the output module:

ranks abstracts of multiple determined documents based on a number of the keywords from the inquiry word that are matched in each of the documents; and outputs the ranked abstracts according to a predetermined data format.

15. The one or more tangible computer-readable storage media of claim 9, wherein the operations further comprise outputting the abstract as a search result.

16. The one or more tangible computer-readable storage media of claim 15, wherein the operations further comprise:

ranking, by the computing device, abstracts of multiple determined documents based on a number of the keywords from the inquiry word that are matched in each of the documents; and outputting, by the computing device, the ranked abstracts according to a predetermined data format.

17. The one or more tangible computer-readable storage media of claim 9, wherein each portion has a length that does not exceed the length limit.

18. The one or more tangible computer-readable storage media of claim 17, wherein, when multiple portions in the plurality of portions each include the highest number of the one or more keywords, the abstract is the one of the multiple portions that has a greatest total number of the keywords, including keywords that are repeated.

19. The method of claim 4, wherein the finding the portion among the plurality of portions comprises:

determining, by the computing device, the beginning position of the portion and the ending position of the portion according to the first data structure, the second data structure, and the length limit, the determining including:

in response to determining that a total length of traversed words in the first data structure is less than the length limit, setting the beginning position to a location of a first traversed word in the first data structure and setting the ending position to a location of a last traversed word in the first data structure; or in response to determining that the total length of traversed words in the first data structure is not less than the length limit, utilizing the second data structure to determine one or more portions of the respective document that have lengths less than the length limit, to determine the portion of the one or more portions that has the highest number of the one or more keywords, and to set the beginning position and ending position of the portion based on the locations of a first traversed word and a last traversed word, respectively, in the portion.

20. The one or more tangible computer-readable storage media of claim 10, wherein the finding the portion among the plurality of portions comprises:

determining, by the computing device, the beginning position of the portion and the ending position of the portion according to the first data structure, the second data structure, and the length limit, the determining including:

in response to determining that a total length of traversed words in the first data structure is less than the length limit, setting the beginning position to a location of a first traversed word in the first data structure and setting the ending position to a location of a last traversed word in the first data structure; or in response to determining that the total length of traversed words in the first data structure is not less than the length limit, utilizing the second data structure to determine one or more portions of the respective document that have lengths less than the length limit, to determine the portion of the one or more portions that has the highest number of the one or more keywords, and to set the beginning position and ending position of the portion based on the locations of a first traversed word and a last traversed word, respectively, in the portion.

* * * * *